US005578981A

United States Patent [19]

Tokuda

[11] Patent Number: 5,578,981

[45] Date of Patent: Nov. 26, 1996

[54] LAMINATED INDUCTOR

[75] Inventor: Hiromichi Tokuda, Nagaokakyo, Japan

[73] Assignee: Murata Manufacturing Co., Ltd., Nagaokakyo, Japan

[21] Appl. No.: 57,670

[22] Filed: May 5, 1993

[30] Foreign Application Priority Data

May 8, 1992 [JP] Japan .............................. 4-030021 U

[51] Int. Cl.[6] .............................. H01G 27/30

[52] U.S. Cl. .............................. 336/171; 333/185; 336/200; 336/223

[58] Field of Search .............................. 336/200, 232, 336/233, 234, 170, 171, 192, 223, 225; 333/185

[56] References Cited

U.S. PATENT DOCUMENTS 3,833,872 9/1974 Marcus et al. .............................. 336/232
4,803,453 2/1989 Tomono et al. .............................. 336/200
4,918,417 4/1990 Sakamoto .............................. 336/233

FOREIGN PATENT DOCUMENTS 2-128409 5/1990 Japan .............................. 336/200
3-126204 5/1991 Japan .............................. 336/200

*Primary Examiner*—Thomas J. Kozma
*Attorney, Agent, or Firm*—Burns, Doane, Swecker & Mathis, LLP

[57] ABSTRACT

A laminated inductor which is adopted in an electronic circuit. The laminated inductor has a plurality of coil sections which are composed by laminating insulating layers and coil conductors alternately. The two adjacent coil sections are staggered at least either in the vertical direction or in the horizontal direction.

3 Claims, 7 Drawing Sheets

LAMINATED INDUCTOR

BACKGROUND OF THE INVENTION

1. Field of the Invention

The present invention relates to a laminated inductor which is installed in an electronic circuit.

2. Description of Related Art

Conventionally, a laminated inductor 81 shown in FIG. 9 has been used for avoiding electromagnetic interference and maintaining immunity of IC parts. The inductor 81 comprises a plurality of coil sections 82 which are composed by laminating insulating layers and coil conductors alternately. Both ends of each coil section 82 are connected with external electrodes 86 and 87 through leading sections 84 and 85.

However, up to now, since all the coil sections 82 are provided at the same level in a vertical direction and provided in a line in a horizontal direction, spaces between the adjacent coil sections 82 are narrow and a large crosstalk is caused between the coil sections 82 by inductive coupling and capacitive coupling. Particularly, when a pitch between the external electrodes 86 and 87 becomes narrow by downsizing of the inductor 81, the spaces between the coil sections 82 become narrower and the crosstalk becomes larger. This may cause a wrong operation of the IC parts to be protected.

SUMMARY OF THE INVENTION

An object of the present invention is to provide a laminated inductor which has a structure to decrease a cross-talk between adjacent coil sections.

In order to attain the object, a laminated inductor according to the present invention comprises a plurality of coil sections which are composed by laminating insulating layers and coil conductors alternatively, the two adjacent coil sections being staggered at least either in a vertical direction or a horizontal direction of the inductor.

In the above structure, since the two adjacent coil sections are staggered at least either in the vertical direction of the inductor or in the horizontal direction, the space between adjacent coils become larger. Thus, the crosstalk which is caused by inductive coupling and capacitive coupling between the coil sections becomes smaller.

Further, by staggering leading sections which are connected with the two adjacent coil sections in the vertical direction, the crosstalk which is caused by the conductive coupling and the capacitive coupling between the coil sections and the leading sections can be decreased.

BRIEF DESCRIPTION OF THE DRAWINGS

This and other objects and features of the present invention will become apparent from the following description taken in conjunction with the preferred embodiments in reference to the accompanying drawings, in which.

DETAILED DESCRIPTION OF THE PREFERRED EMBODIMENTS

Figure 1:
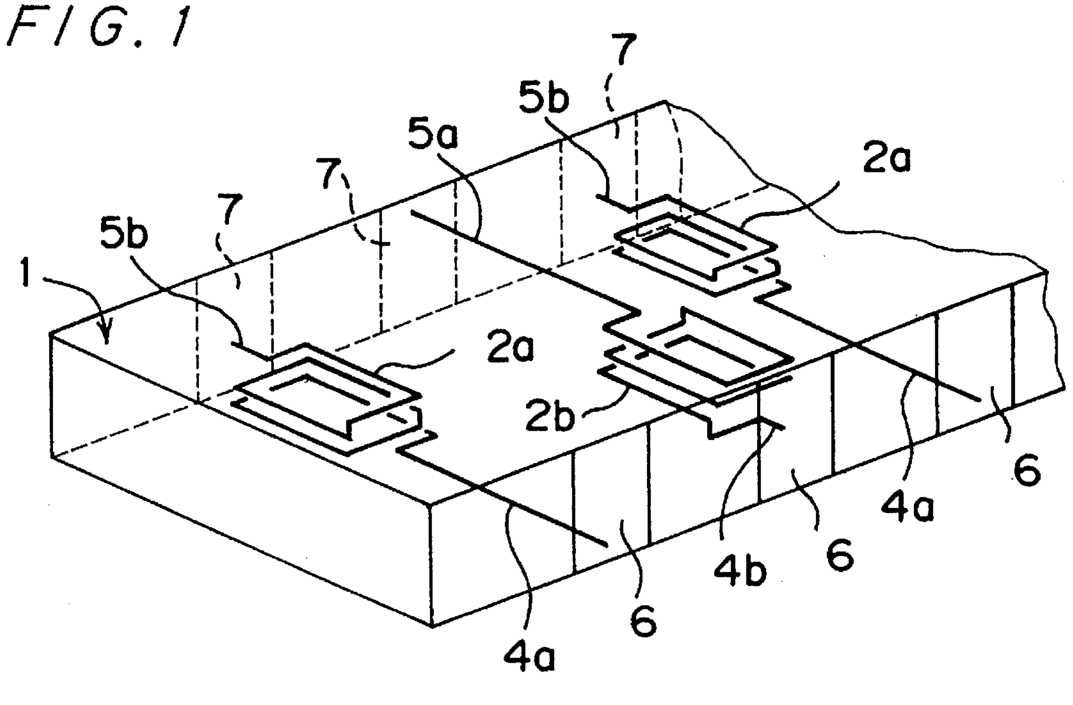
FIG. 1 is a perspective view which shows a structure of a first embodiment of a laminated inductor according to the present invention.

The description of preferred embodiments according to the present invention is given below, referring to the drawings.

FIRST EMBODIMENT: FIGS. 1 THROUGH 15

As shown in FIG. 1, a laminated inductor 1 comprises a plurality of coil sections 2*a* and 2*b* which are composed or formed by laminating insulating layers and coil conductors alternately. More specifically, the coil sections 2*a* and 2*b* are formed by connecting coil conductors electrically through through holes which are provided on the insulating layers. The coil sections 2*a* and 2*b* are staggered in the vertical direction and the horizontal direction of the inductor 1. Therefore, the space between two adjacent coil sections 2*a* and 2*b* is larger than the space between two adjacent coil sections of the conventional inductor.

Both ends of the coil sections 2*a* and 2*b* are connected with inline type external electrodes 6 and 7 which are provided on sides of the inductor 1 through leading sections 4*a*, 4*b*, 5*a* and 5*b*. The leading section 4*a* is provided at a lower part of the inductor 1, whereas and the adjacent coil section 2*b* is provided at an upper part of the inductor 1. In the same way, the leading section 5*a* is provided at the upper part of the inductor 1, and the adjacent coil section 2*a* is provided at the lower part of the inductor 1. Thereby, crosstalks between the coil section 2*a* and the leading section 5*a* and between the coil section 2*b* and the leading section 4*a* are decreased.

A manufacturing process of the laminated inductor is explained below referring to FIG. 2 through FIG. 12. Conductors 12, 13, 14, 15, 16, 17, 18 and 19 for forming a coil are provided on insulating sheets 11*b*, 11*c*, 11*d*, 11*e*, 11*g*, 11*h*, 11*i* and 11*j* respectively. Insulating sheets 11*a* and 11*k* are used as protective layers. An insulating sheet 11*f* is used as an intermediate layer. These insulating sheets 11*a* through 11*k* are laminated to form the inductor 1. As a material of the insulating sheets 11*a* through 11*k*, for example, ferrite can be used.

Figure 2:
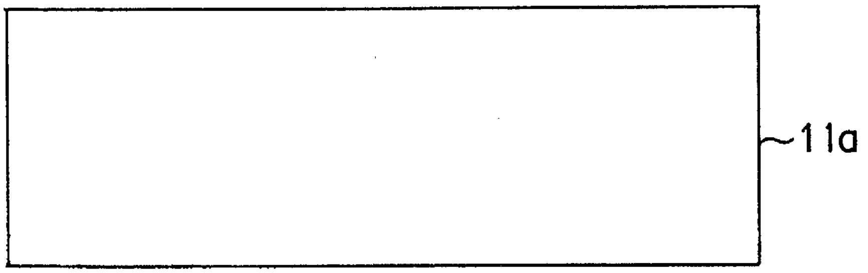
FIGS. 2 through 12 are plan views which show insulating sheets used in the laminated inductor shown in FIG. 1.
Figure 3:
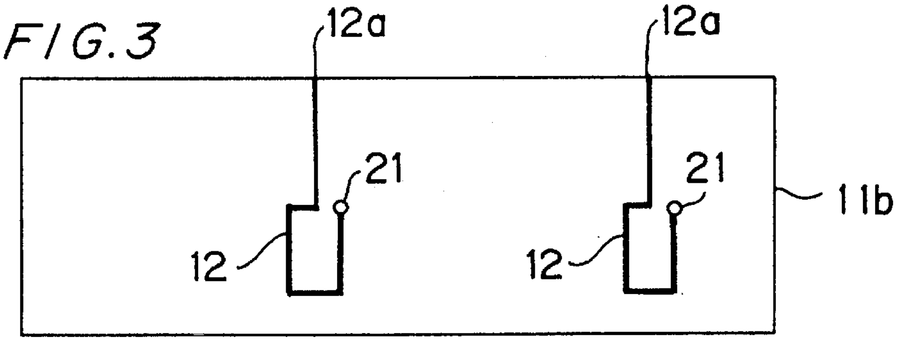
Figure 4:
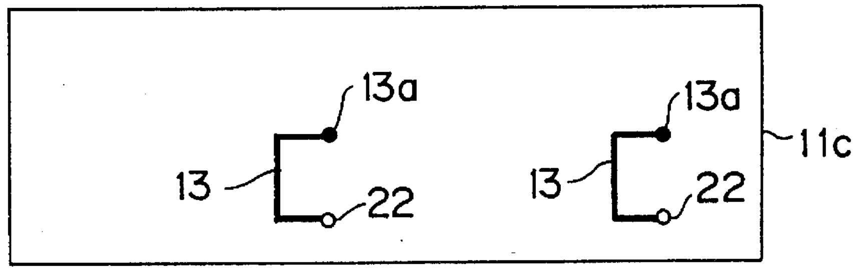
Figure 5:
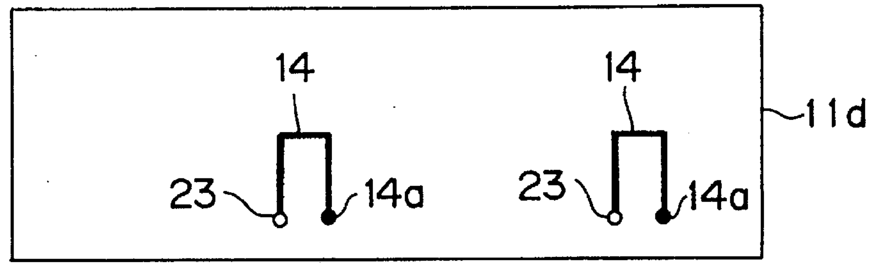
Figure 6:
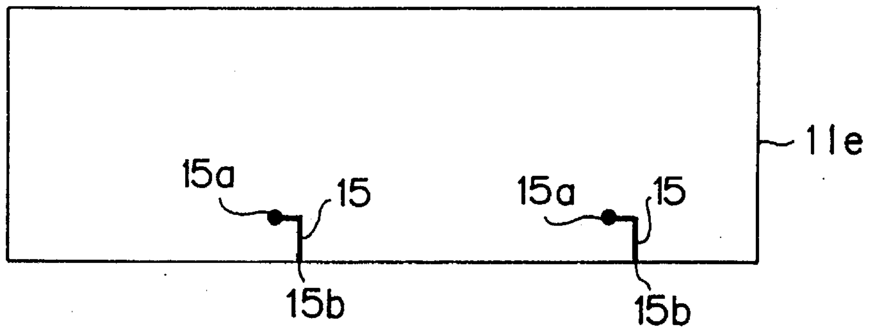
Figure 7:
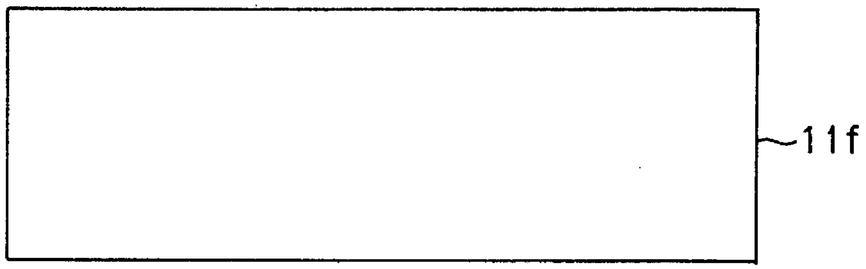
Figure 8:
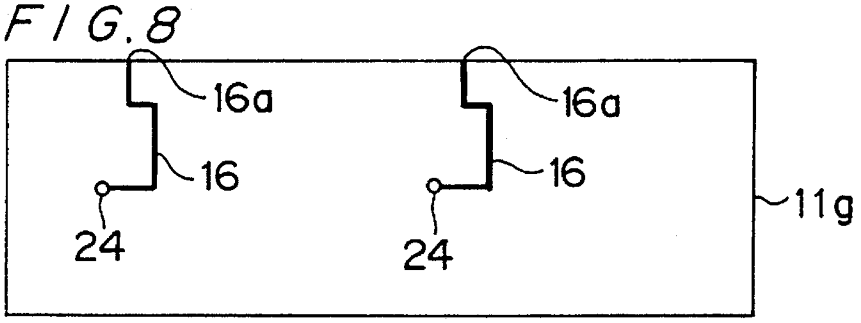
Figure 9:
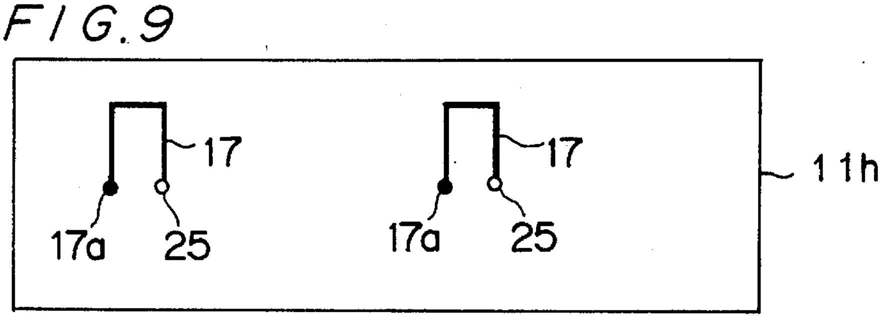
Figure 10:
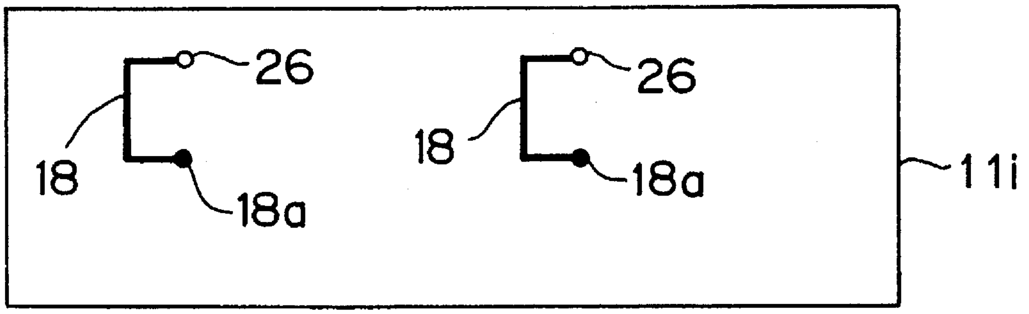
Figure 11:
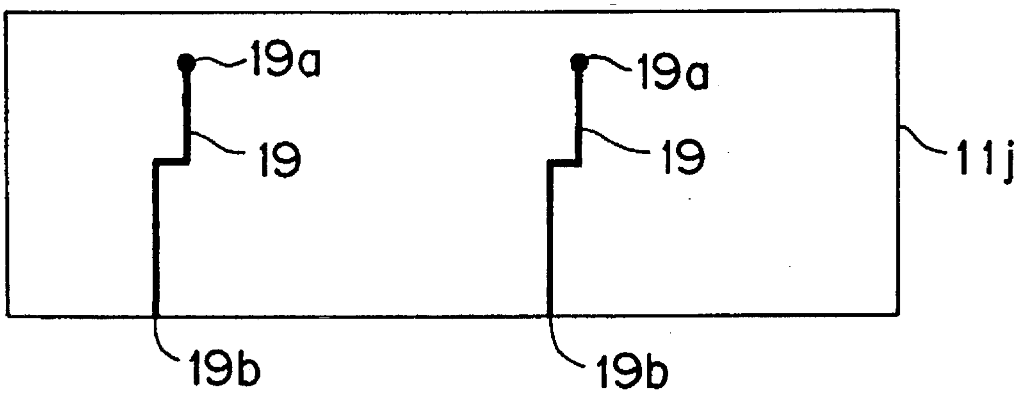
Figure 12:
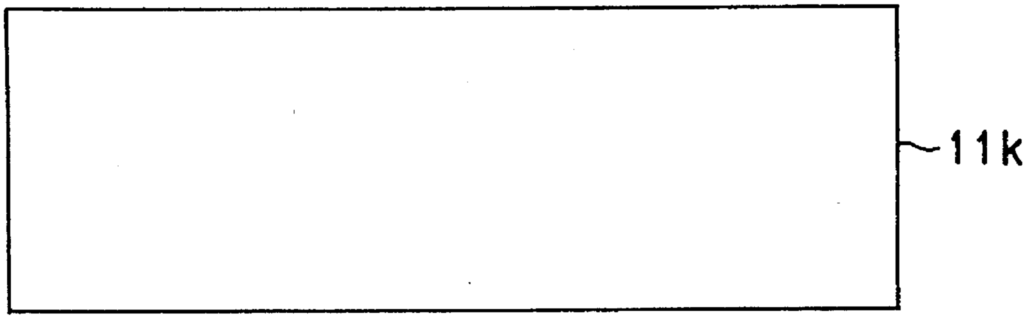

As shown in FIG. 2, nothing is provided on the insulating sheet 11*a*. As shown in FIG. 3, ends 12*a* of two coil conductors 12 which are provided on the insulating sheet 11*b* are exposed at a side of the insulating sheet 11*b*. Through holes 21 are provided at the other ends of the coil conductors 12. As shown in FIG. 4, two coil conductors 13 are provided on the insulating sheet 11*c*. Pads 13*a* are provided at ends of the coil conductors 13. Through holes 22 are provided at the other ends of the coil conductors 13. As shown in FIG. 5, two coil conductors 14 are provided on the insulating sheet 11*d*. Pads 14*a* are provided at ends of the coil conductors 14, and through holes 23 are provided at the other ends of the coil conductors 14. As shown in FIG. 6, two coil conductors 15 are provided on the insulating sheet 11*e*. Pads 15*a* are provided at ends of the coil conductors 15. The other ends 15*b* of the coil inductors 15 are exposed at a side of the insulating sheet 11*e*. As shown in FIG. 7, nothing is provided on the insulating sheet 11*f*. As shown in FIG. 8, two coil conductors 16 are provided on the insulating sheet 11*g*. Ends 16*a* of the coil conductors 16 are exposed at a side of the insulating sheet 11*g*. Through holes 24 are provided at the other ends of the coil conductors 16. As shown in FIG. 9, two coil conductors 17 are provided on the insulating sheet 11*h*. Pads 17*a* are provided at ends of the coil conductors 17, and through holes 25 are provided at the other ends of the coil conductors 17. As shown in FIG. 10, two coil conductors 18 are provided on the insulating sheet 11*i*. Pads 18*a* are provided at ends of the coil conductors 18, and through holes 26 are provided at the other ends of the coil conductor 18. As shown in FIG. 11, two coil conductors 19 are provided on the insulating sheet 11*j*. Pads 19*a* are provided at ends of the coil inductors 19, and the other ends 19*b* are exposed a side of the insulating sheet 11*j*. As shown in FIG. 12, nothing is provided on the insulating sheet 11*k*.

The insulating sheets 11*a* through 11*k* are laminated in order with the insulating sheet 11*k* at the bottom and the insulating sheet 11*a* at the top. Then, the laminate of the insulating sheets 11*a* through 11*k* is sintered. The external electrodes 6 and 7 are formed on sides of the laminated inductor 1, and thereby, the laminated inductor 1 shown in FIG. 1 is made. In the laminate of the insulating sheets 11*a* through 11*k*, the coil conductors 12 through 15 are connected in series electrically by respective electrical connections between the through holes 21, 22 and 23 and the pads 13*a*, 14*a* and 15*a*, and thereby the coil section 2*b* is formed. In the same way, the coil conductors 16 through 19 are connected in series electrically by respective electrical connections between the through holes 24, 25 and 26 and the pads 17*a*, 18*a* and 19*a*, and thereby the coil section 2*a* is formed. The coil sections 2*a* and 2*b* are arranged at equal intervals. Also, the ends 12*a* of the coil conductors 12 are connected with the external electrodes 7, and thereby a part of the coil conductors 12 forms the leading section 5*a*. In the same way, the ends 15*b* of the coil conductors 15 are connected with the external electrodes 6, and thereby a part of the coil conductors 15 forms the leading section 4*b*. The ends 16*a* of the coil conductors 16 are connected with the external electrodes 7, and thereby a part of the coil conductors 16 forms the leading section 5*b*. The ends 19*b* of the coil conductors 19 are connected with the external electrodes 6, and thereby a part of the coil conductors 19 forms the leading section 4*a*.

Figure 13:
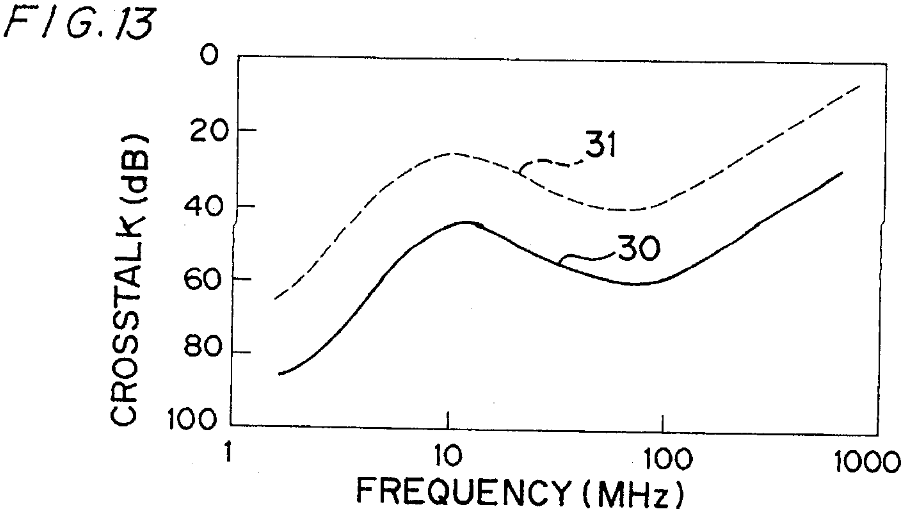
FIG. 13 is a graph which shows a measuring result of a crosstalk of the laminated inductor shown in FIG. 1.

FIG. 13 shows a measuring result of a crosstalk between two adjacent coil sections 2*a* and 2*b* provided in the above laminated inductor 1. In the laminated inductor 1 used in the measurement, the pitch among the external electrodes 6 or the external electrodes 7 is 1.27 mm, the width of the conductors of the coil sections 2*a* and 2*b* is 0.2 mm, and the resistance between a pair of external electrodes 6 and 7 is 50 Ω. The ordinate of the graph shows the crosstalk, and the abscissa shows the frequency. A solid line 30 shows the crosstalk characteristics of the laminated inductor 1 which is the first embodiment of the present invention. A dotted line 31 shows the crosstalk characteristics of a conventional laminated inductor. As is apparent from FIG. 13, the crosstalk of the laminated inductor 1 is smaller than that of the conventional laminated inductor.

Figure 14:
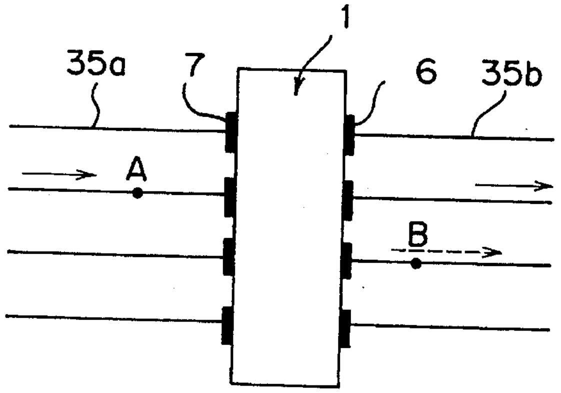
FIG. 14 is an electric circuit diagram of the laminated inductor shown in FIG. 1 in a condition of being connected with signal transmitting lines.
Figure 15:
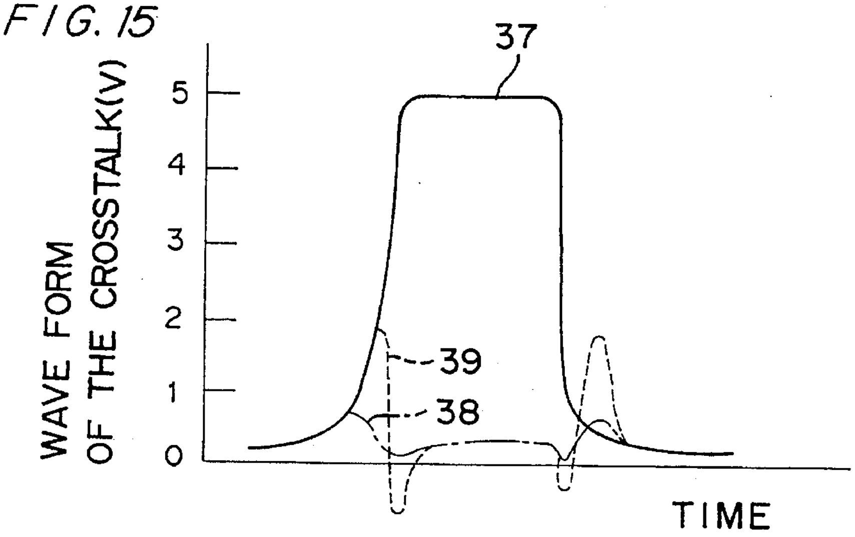
FIG. 15 is a graph which shows wave forms of the crosstalk of the electric circuit shown in FIG. 14.

Next, as shown in FIG. 14, the laminated inductor 1 is inserted between signal transmitting lines 35*a* and 35*b* to measure the wave form of the crosstalk. FIG. 15 shows the measuring result. In FIG. 15, a solid line 37 shows a wave form of an input signal at the point A shown in FIG. 14. A dashed line 38 shows a wave form of an output crosstalk at the point B shown in FIG. 14. The input signal which passes through the point A is inputted to the external electrode 7, then the signal is outputted from the external electrode 6 through the coil section 2*a*. In this case, when the signal goes through the coil section 2*a*, the crosstalk is caused between the coil section 2*a* and its adjacent coil section 2*b* by the conductive coupling and the capacitive coupling. The output wave form caused by this crosstalk is measured at the point B of the adjacent signal transmitting line. For comparison, the dotted line 39 shows the crosstalk output wave form of the conventional laminated inductor measured at the point B. The amplitude of the dashed line 38 is smaller than that of the dotted line 39. This indicates that the crosstalk of the laminated inductor 1 is smaller than that of the conventional laminated inductor.

SECOND EMBODIMENT: FIG. 16

Figure 16:
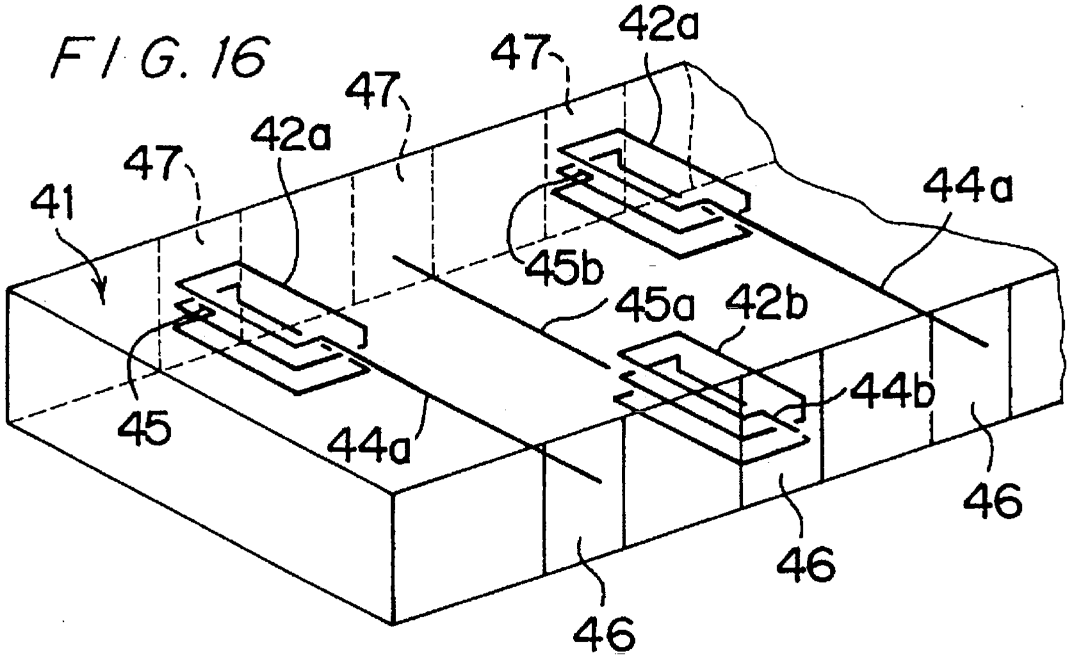
FIG. 16 is a perspective view which shows a structure of a second embodiment of the laminated inductor according to the present invention.

FIG. 16 shows a laminated inductor 41 which is the second embodiment of the present invention. The laminated inductor 41 comprises a plurality of coil sections 42*a* and 42*b* which are composed by laminating insulating layers and coil conductors alternately. The coil sections 42*a* and 42*b* are formed by connecting the coil conductors electrically by through holes which are provided on the insulating layers. The coil sections 42*a* and 42*b* are staggered in the horizontal direction of the inductor 41. Thus, the space between two adjacent coil sections is larger than that of a conventional laminated inductor.

Both ends of the coil sections 42*a* and 42*b* are connected with external electrodes 46 and 47 which are provided on sides of the inductor 41 through the leading sections 44*a*, 44*b*, 45*a* and 45*b* respectively.

In the above laminated inductor 41, since the space between two adjacent coil sections 42*a* and 42*b* is larger than that of a conventional one, the conductive coupling and the capacitive coupling between the coil sections 42*a* and 42*b* become smaller. Accordingly, in the laminated inductor, crosstalks between the coil sections can be decreased.

THIRD EMBODIMENT: FIG. 17

Figure 17:
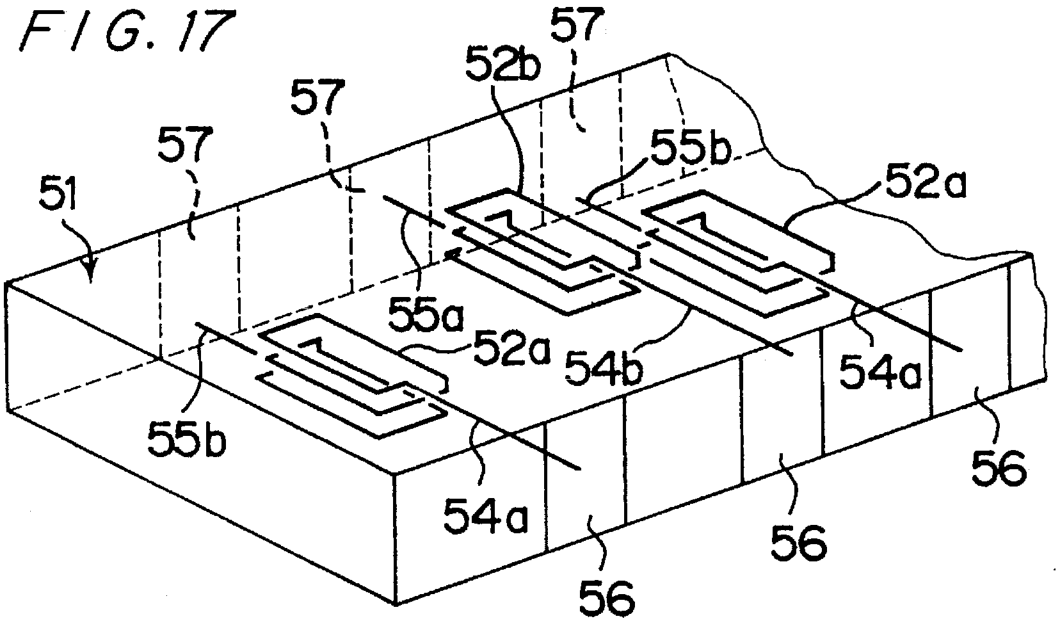
FIG. 17 is a perspective view which shows a structure of a third embodiment of the laminated inductor according to the present invention.

FIG. 17 shows a laminated inductor 51 which is the third embodiment of the present invention. The laminated inductor 51 comprises a plurality of coil sections 52*a* and 52*b* which are composed by laminating insulating layers and coil conductors alternately. The coil sections 52*a* and 52*b* are composed by connecting the coil conductors electrically by through holes which are provided on the insulating layers. The coil section 52*a* and 52*b* are provided staggered in the vertical direction, that is, the coil sections 52*a* and 52*b* are provided on different levels. Thus, compared with a conventional laminated inductor, the space between two adjacent coil sections 52*a* and 52*b* become larger. Both ends of the coil sections 52*a* and 52*b* are connected with external electrodes 56 and 57 which are provided at sides of the inductor 51 through leading sections 54*a*, 54*b*, 55*a* and 55*b*.

The above laminated inductor 51 has the same function and effect as the one of the first embodiment.

OTHER EMBODIMENTS

Figure 18:
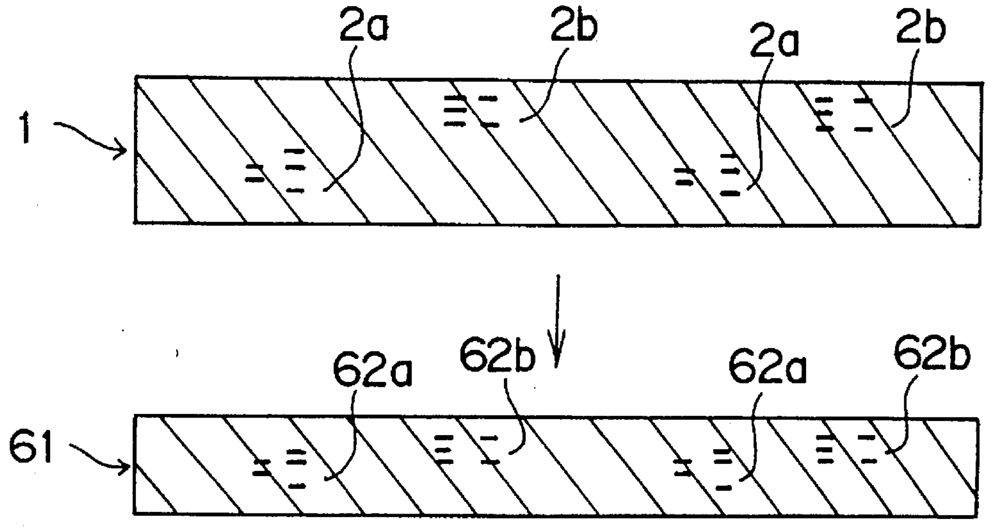
FIG. 18 is a sectional view which shows a modifications of the laminated inductor shown in FIG. 1.
Figure 19:
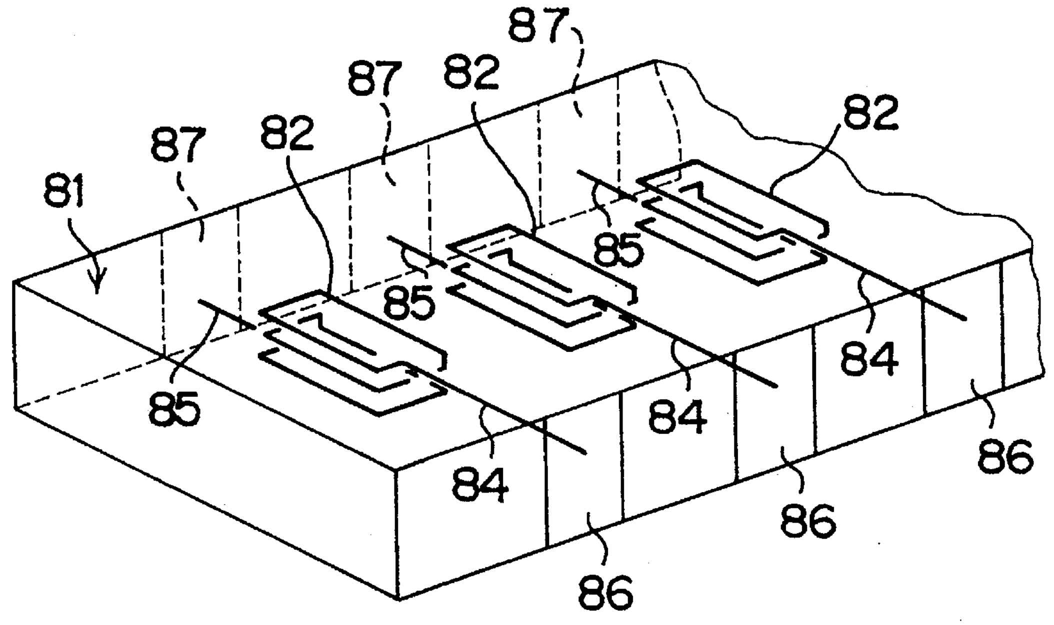
FIG. 19 PRIOR ART
FIG. 19 is a perspective view which shows a structure of a conventional laminated inductor.

Even in a case of staggering coil sections in the vertical direction, as shown in FIG. 18, part of a coil section 62*a* and a part of a coil section 62*b* adjacent to the coil section 62*a* can be provided on the same insulating sheet. In this case, compared with the inductor 1 which is the first embodiment of the present invention, wherein the conductors of a coil section 2*a* and the conductors of a coil section 2*b* are provided on the lower half insulating sheets 11*g* through 11*j* and on the upper half insulating sheets 11*b* through 11*e* respectively, the effect to decrease the cross-talk becomes weak. However, this type is more downsizing. Also, the conductors of the coil section is not limited to be formed into a spiral and can be formed into straight line.

Further, in the above embodiments, insulating sheets having coil conductors thereon, the producing method is not limited to the above. For example, the following producing method can also be adopted. Paste of an insulating material is applied onto a base by screen printing. After the insulating material is dried and forms an insulating layer, paste of a conductive material is applied onto the surface of the insulating layer to form a coil of a predetermined pattern. After the conductive material is dried and forms coil conductor, the insulating material paste is applied onto the coil conductor. The insulating material is dried and forms another insulating layer. An inductor which has a laminate structure can be obtained by applying these materials alternately.

Although the present invention has been described in connection with the preferred embodiments above, it is to be noted that various changes and modifications are apparent to a person skilled in the art. Such changes and modifications are to be understood as being within the scope of the present invention.

What is claimed is:

1. An array type of a laminated inductor noise filter for insertion in a signal transmitting line comprising:

at least three inductors, each of said inductors including, a coil section, which is formed of alternating laminating insulating layers and coil conductors, said coil section having a spiral coil which is formed by connecting coil conductors electrically through the insulating layers, a pair of leading sections which have different lengths and extend from said coil section to opposite sides of the laminated inductor, and a pair of in-line type of external electrodes which are disposed on opposite sides of the laminated inductor, said in-line type of external electrodes being connected to said coil section through said leading sections;

the coil sections of the inductors being staggered in both a vertical direction and a first horizontal direction of the inductor to reduce magnetic coupling between the coil sections, and the coil section for one of said inductors and one of said pair of leading sections for an adjacent inductor to the one inductor being staggered in the vertical direction, and axes of the spiral coils of the coil sections being displaced from one another along a second horizontal direction of the inductor and being staggered in said first horizontal direction of the laminated inductor.

2. An array type of a laminated inductor according to claim 1, wherein the coil sections are formed by laminating insulating sheets having the coil conductors therein.

3. An array type of a laminated inductor according to claim 1, wherein said coil sections are arranged at equal intervals.

* * * * *